United States Patent
Wei

(10) Patent No.: US 10,761,490 B2
(45) Date of Patent: Sep. 1, 2020

(54) ELECTRONIC APPARATUS AND INFORMATION PROCESSING METHOD

(71) Applicant: Lenovo (Beijing) Co., Ltd., Beijing (CN)

(72) Inventor: Zhiyu Wei, Beijing (CN)

(73) Assignee: LENOVO (BEIJING) CO., LTD., Haidian District, Beijing (CN)

( * ) Notice: Subject to any disclaimer, the term of this patent is extended or adjusted under 35 U.S.C. 154(b) by 143 days.

(21) Appl. No.: 14/636,677

(22) Filed: Mar. 3, 2015

(65) Prior Publication Data
US 2016/0077493 A1 Mar. 17, 2016

(30) Foreign Application Priority Data
Sep. 16, 2014 (CN) .......................... 2014 1 0472253

(51) Int. Cl.
*G04G 21/00* (2010.01)
*G06F 1/16* (2006.01)
(Continued)

(52) U.S. Cl.
CPC ............. *G04G 21/00* (2013.01); *G04G 17/02* (2013.01); *G04G 17/08* (2013.01); *G06F 1/163* (2013.01); *G06F 3/03548* (2013.01)

(58) Field of Classification Search
CPC .. G06F 1/163; G06F 3/04845; G06F 3/03548; G04G 21/00; G04G 17/02; G04G 17/08; G04G 1/163
(Continued)

(56) References Cited

U.S. PATENT DOCUMENTS 6,857,775 B1 * 2/2005 Wilson ............... G04B 37/1486
224/164
7,193,606 B2 * 3/2007 Barnett .................. G04G 21/00
345/156
(Continued)

FOREIGN PATENT DOCUMENTS

CN 1306636 A 8/2001
CN 1446501 A 10/2003
(Continued)

OTHER PUBLICATIONS

First Office Action dated Apr. 18, 2018 (29 pages including English translation) from Chinese priority Application No. 201410472253.9.
(Continued)

*Primary Examiner* — Kent W Chang
*Assistant Examiner* — Sujit Shah
(74) *Attorney, Agent, or Firm* — Brinks Gilson & Lione; John C. Freeman

(57) ABSTRACT

An electronic apparatus and an information processing method are described, which solve the technical problem that the relative position between respective bodies of wearable devices are unchangeable, and achieve the technical effect that a relative position between a display body and a fixation body of the electronic apparatus are changeable. The electronic apparatus includes a display body configured to output image information in a display state; a fixation body configured to maintain a relative position relationship between the electronic apparatus and at least a portion of a user's body when the electronic apparatus is in a fixed state; and a connection device configured to connect the display body and the fixation body and through which a relative position between the display body and the fixation body can be changed.

17 Claims, 4 Drawing Sheets

(51) Int. Cl.
*G04G 17/02* (2006.01)
*G04G 17/08* (2006.01)
*G06F 3/0354* (2013.01)

(58) Field of Classification Search
USPC .............................................................. 345/8
See application file for complete search history.

(56) References Cited

U.S. PATENT DOCUMENTS

| | | | | |
|---|---|---|---|---|
| 2003/0182770 A1* | 10/2003 | Koshoji | ............... | A44C 5/0015 24/265 WS |
| 2004/0192418 A1* | 9/2004 | Nam | ............... | H01M 2/1022 455/575.1 |
| 2005/0163558 A1* | 7/2005 | Lee | ............... | F16M 11/10 403/45 |
| 2006/0018202 A1* | 1/2006 | Girardin | ............ | A44C 15/0025 368/281 |
| 2006/0034161 A1* | 2/2006 | Muller | ............... | G04B 37/0427 368/281 |
| 2007/0153639 A1* | 7/2007 | Lafever | ............... | G04B 37/1486 368/282 |
| 2007/0189127 A1* | 8/2007 | Pollak | ............... | G04B 45/0084 368/294 |
| 2007/0253290 A1* | 11/2007 | Aire | ............... | G04B 3/045 368/294 |
| 2008/0144446 A1* | 6/2008 | Karterman | ......... | G04B 37/0427 368/88 |
| 2008/0169998 A1* | 7/2008 | Jacobsen | ............ | G02B 27/0172 345/8 |
| 2009/0045311 A1* | 2/2009 | Seyedin | ............... | F16C 19/10 248/349.1 |
| 2009/0059734 A1* | 3/2009 | Burton | ............... | G04B 37/0008 368/281 |
| 2009/0126243 A1* | 5/2009 | Schellingerhout | ...... | G09F 21/02 40/586 |
| 2009/0196124 A1* | 8/2009 | Mooring | ............... | G04B 37/005 368/204 |
| 2011/0014956 A1* | 1/2011 | Lee | ............... | H04M 1/274525 455/569.1 |
| 2011/0195754 A1* | 8/2011 | Aoshima | ............... | G06F 1/1616 455/566 |
| 2013/0088943 A1* | 4/2013 | Teixeira | ............ | G04B 45/0069 368/282 |
| 2013/0235546 A1* | 9/2013 | Sedillo | ............... | H05K 7/02 361/809 |
| 2013/0329936 A1* | 12/2013 | Tseng | ............... | H04R 1/02 381/387 |
| 2014/0160078 A1* | 6/2014 | Seo | ............... | G06F 3/017 345/175 |
| 2014/0239065 A1* | 8/2014 | Zhou | ............... | G06F 3/017 235/380 |
| 2015/0362998 A1* | 12/2015 | Park | ............... | G06F 3/017 345/173 |

FOREIGN PATENT DOCUMENTS

| | | |
|---|---|---|
| CN | 1649035 A | 8/2005 |
| CN | 1768309 A | 5/2006 |

OTHER PUBLICATIONS

Third Office Action dated May 20, 2019 (18 pages including English translation) from Chinese priority Application No. 201410472253.9.

* cited by examiner

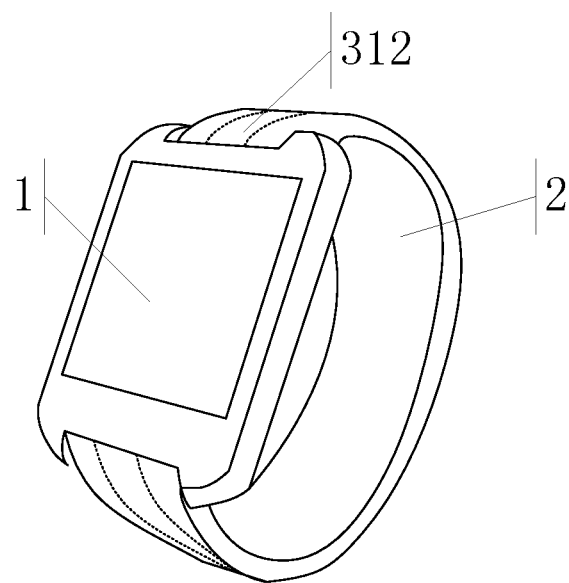
FIG. 1
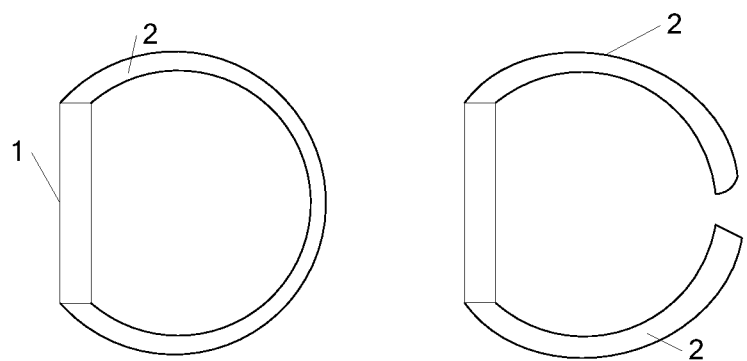
FIG. 2a
FIG. 2b

ELECTRONIC APPARATUS AND INFORMATION PROCESSING METHOD

This application claims priority to Chinese patent application No. 201410472253.9 filed on Sep. 16, 2014, the entire contents of which is incorporated herein by reference.

The present application relates to the field of electronics technique, and more particularly to an electronic apparatus and an information processing method.

BACKGROUND

Wearable devices appear on the market only in recent years. They win the favor of the users soon, for they can be easily worn and support many functions, like shooting function and communication function etc.

In wearable devices currently on the market, a display body and a fixation unit thereof almost are relatively fixed, such structure causes inconvenience to the users in some aspects. For example, a display body and a strap of a smart watch are fixed, when a user desires to adjust the display body from the inside of the wrist to the outside thereof, he/she needs to rotate the strap to achieve this. However, the strap usually has a relatively large friction with the wrist, so it will take some time to adjust, and the user's wrist feels discomfort.

Therefore, in the wearable devices, the relative position between respective bodies is unchangeable.

SUMMARY

The present application provides an electronic apparatus and an information processing method, which achieve the technical effect that a relative position between a display body and a fixation body of the electronic apparatus are changeable.

In an aspect, the present application provides an electronic apparatus, comprising: a display body configured to output image information in a display state; a fixation body configured to attach the electronic apparatus to a user's body; and a connection device that connects to the display body and the fixation body, wherein the connection device is operable to change a relative position between the display body and the fixation body.

Optionally, the electronic apparatus further comprises: a reset mechanism disposed at a first setting position of the connection device, when the display body slides from an initial position on the fixation body to a first position different than the initial position under the action of an external force, a recoil force directed to the initial position is generated on the display body by the reset mechanism, so that when the external force stops acting on the display body, the display body slides back to the initial position from the first position under the action of the recoil force.

Optionally, the electronic apparatus further comprises: a reset mechanism disposed at a first position of the connection device, wherein the reset mechanism is operable to move the display body back to an initial position on the fixation body via a sliding motion.

Optionally, the electronic apparatus further comprises: a lock mechanism disposed at a second setting position of the connection device, and configured to when the display body slides from an initial position on the fixation body to a second position different than the initial position, lock the display body at the second position.

Optionally, the electronic apparatus further comprises: a lock mechanism disposed at a second position of the connection device, and configured to lock the display body relative to the fixation body.

Optionally, the fixation body provides at least a portion of an annular space, the at least one portion of the annular space surrounding a periphery of a columnar body of the fixation body.

Optionally, the fixation body has at least a fixed state; the fixation body serves as at least a portion of an annular space or at least a portion of an approximate annular space that satisfies a first predetermined condition; wherein the annular space or the approximate annular space can surround periphery of a columnar body that satisfies a second predetermined condition.

Optionally, the electronic apparatus further comprises: a detection device configured to detect a current relative position between the display body and the fixation body; and a processor disposed internally within the display body and connected with the detection device; when the detection device detects that the current relative position of the display body is different than an initial relative position, the processor generates a switch instruction to switch the display body from a non-display state to the display state.

Optionally, the electronic apparatus further comprises: a detection device configured to detect a relative position between the display body and the fixation body; and a processor disposed internally within the display body and connected with the detection device; wherein the processor is operable to generate a switch instruction so that the display body operates in the display state, upon the detection device detecting a change in the relative position between the display body and the fixation body.

Optionally, the electronic apparatus further comprises: an input device disposed on the display body or the fixation body and connected with the processor; when the processor receives trigger information sent by the input device, the processor generates the switch instruction and controls the display body to output second image information different than the first image information; wherein the first image information is image information output by the display body as controlled by the processor after the processor generates the switch instruction based on the detection device detects that the current relative position of the display body is different than the initial relative position.

Optionally, the electronic apparatus further comprises: an input device disposed on the display body or the fixation body and connected with the processor, wherein the processor is operable to generate a control instruction to control the display body to output a different image information, upon receiving trigger information from the input device.

Optionally, the processor is specifically configured to: determine an i-th preset position of the relative position from among N preset positions, N being a positive integer, i being an integer from 1 to N; determine an i-th application corresponding to the i-th preset position from among N applications, the N applications being different to each other; and generate an instruction for starting the i-th application to start the i-th application and control the display body to display the i-th application.

Optionally, the connection device comprises: a slide chute disposed on the fixation body; and a slider connected with the display body and capable of sliding in the slide chute.

Optionally, the reset mechanism comprises: a resilient architecture whose first connect end is disposed at a first setting position of the slide chute, and second connect end is connected to the slider; when the display body is located at the initial position, the resilient architecture does not act on the slider.

Optionally, the electronic apparatus further comprises: a reset mechanism for moving the display body back to an initial position on the fixation body, wherein the reset mechanism comprises: a resilient architecture having a first connect end disposed at a first position of the slide chute, and a second connect end connected to the slider.

Optionally, the electronic apparatus further comprises: a lock mechanism for locking the display body relative to the fixation body, wherein the lock mechanism comprises: at least one first tooth disposed on a first surface of the slide chute; and at least one second tooth disposed on a second surface of the slider, the first surface and the second surface facing each other; the at least one first tooth and the at least one second tooth engage with each other so that the display body is locked at the second position.

Optionally, the connection device comprises: a slideway disposed on the fixation body; a slide vane on which the display body is disposed; and a ball rollably disposed between the slideway and the slide vane.

Optionally, the electronic apparatus further comprises: a reset mechanism for moving the display body back to an initial position on the fixation body, wherein the reset mechanism comprises: a resilient architecture whose first connect end is disposed at a second setting position of the slideway, and second connect end is connected to the slide vane; when the display body is located at the initial position, the resilient architecture does not act on the slide vane.

Optionally, the electronic apparatus further comprises: a lock mechanism for locking the display body relative to the fixation body, wherein the lock mechanism comprises: at least one groove disposed at the second position and mating to the ball so as to lock the display body at the second position.

In another aspect, the present application provides an information processing method applied to an electronic apparatus having a display body configured to output image information when being in a display state, a fixation body configured to maintain a relative position relationship between the electronic apparatus and at least a portion of a user's body when the electronic apparatus is in a fixed state, and a connection device configured to connect the display body and the fixation body and through which a relative position between the display body and the fixation body can be changed, the information processing method comprising: detecting a current relative position of the display body; and when the current relative position of the display body is different than an initial relative position, generating a switch instruction to switch the display body from a non-display state to the display state.

In another aspect, the present application provides an information processing method applied to an electronic apparatus, the information processing method comprising: detecting a relative position between a display body and a fixation body of the electronic device; and generating a switch instruction so that the display body operates in a display state.

The aforesaid one or more technical solutions in embodiments of the present application at least have the following one or more technical effects:

In the technical solutions of the present application, the electronic apparatus comprises a display body configured to output image information when being in a display state, a fixation body configured to maintain a relative position relationship between the electronic apparatus and at least a portion of a user's body when the electronic apparatus is in a fixed state, and the display body and the fixation body are connected through a connection device, through the connection device, and the technical effect that a relative position between the display body and the fixation body of the electronic apparatus is changeable is achieved.

BRIEF DESCRIPTION OF THE DRAWINGS

FIG. 1 is a schematic diagram of structure of the electronic apparatus in embodiments of the present application;

FIGS. 2a-2b are schematic diagrams of structure of the fixation body in embodiments of the present application;

BRIEF DESCRIPTION OF THE DRAWINGS

Figure 3:
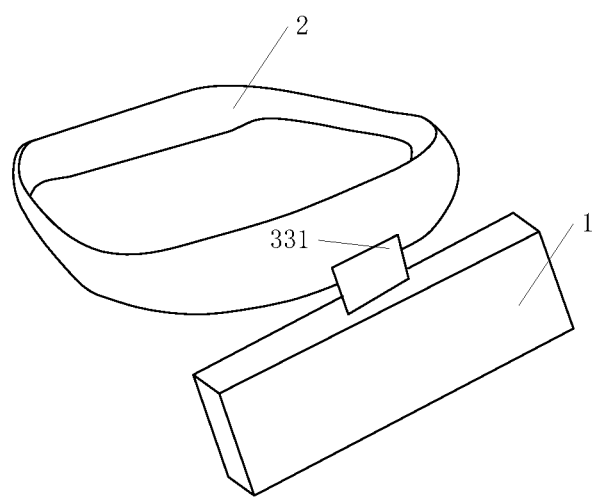
FIG. 3 is a schematic diagram of another structure of the electronic apparatus in embodiments of the present application.

The present application provides an electronic apparatus and an information processing method, which solve the technical problem that the relative position between respective bodies of wearable devices are unchangeable, and achieve the technical effect that a relative position between a display body and a fixation body of the electronic apparatus are changeable.

In order to solve the above technical problem, the technical solutions provided by the present application comprise: a display body configured to output image information in a display state; a fixation body configured to maintain a relative position relationship between the electronic apparatus and at least a portion of a user's body when the electronic apparatus is in a fixed state; and a connection device configured to connect the display body and the fixation body and through which a relative position between the display body and the fixation body can be changed.

In the technical solutions of the present application, the electronic apparatus comprises a display body configured to output image information in a display state, a fixation body configured to maintain a relative position relationship between the electronic apparatus and at least a portion of a user's body when the electronic apparatus is in a fixed state, and the display body and the fixation body are connected through a connection device, through the connection device, the technical problem that the relative position between respective bodies of wearable devices are unchangeable is solved, and the technical effect that a relative position between the display body and the fixation body of the electronic apparatus are changeable is achieved.

To make the objects, technical solutions, and advantages of embodiments of the present application more clear, the technical solutions in the embodiments of the present application will be described explicitly, comprehensively in conjunction with the accompanying drawings thereof, obviously, these described embodiments are not all the embodiments of the present application, but only parts of the embodiments thereof. Based on the embodiments of the present application, other embodiments obtained by those of ordinary skill in the art without paying creative efforts all fall into the protection scope of the present application.

In this document, the term "and/or" merely is an association relationship that describes associated objects, it represents there may be three relationships, for example A and/or B may represent three cases of: A only, both A and B, B only. In addition, the character "/" in this document typically represents the contextual associated objects are of an "or" relationship.

First Embodiment

The electronic apparatus in this embodiment of the present application comprises:

a display body 1 and a fixation body 2, as shown in FIGS. 1-8*b*. In particular, the display body 1 can output image information in a display state. In the embodiment of the present application, the image information includes but not limited to text, picture, video etc. The display body 1 comprises at least a display screen through which a user can view displayed content. In addition, the display body 1 may further comprise one or more buttons, indicator lights, or cameras thereon, and the display body 1 may further comprise a battery, a chip, or a memory card etc. internally, those of ordinary skill in the art can set on their own as needed in practice, the present application makes no specific limitations thereto. Of course, the one or more buttons, indicator lights, or cameras, battery, chip, or memory card etc. may also be disposed on the fixation body 2, the present application makes no limitations thereto.

The fixation body 2 maintains a relative position relationship between the electronic apparatus and at least a portion of a user's body when the electronic apparatus is in a fixed state. In a specific implementation, an attribute parameter of the fixation body 2 should match a physical parameter of the user, for example, the electronic apparatus needs to be fixed on a whist of the user, then a valid circumference of the fixation body 2 that surrounds the whist while maintaining the relative position relationship should be equal to or larger than a circumference of the whist. For instance, typically, a circumference of a whist is in a range of 13-17 cm, so the valid circumference of the fixation body 2 should be at least 17 cm. Alternatively, the electronic apparatus needs to be fixed for example around the head of the user, a forehead circumference of an adult is in a range of 54-58 cm, so the valid circumference of the fixation device 2 may be 58 cm, 59 cm, and so on.

Another example, human' whist approximates an oval, a distance in the direction from the palm center to the back of the hand is smaller than a distance in the direction from the thumb to the little finger, thus, to make the fixation body 2 fit the whist more, shape of the fixation 2 may be set as an oval or an approximate oval, whose major and minor axes are set based on ergonomic parameters. Those of ordinary skill in the art can set on their own as needed in practice, the present application makes no specific limitations thereto.

Further, in the embodiment of the present application, a connection device is further comprised, the connection device is configured to connect the display body 1 and the fixation body 2 and enables a relative position between the display body and the fixation body to be changeable.

Further, when the fixation body 2 and at least a portion of a user's body are fixed, for example, the fixation body 2 is fixed at the whist or head of the user, the relative position of the display body 1 and at least a portion of a user's body can be changed by changing the relative position between the display body 1 and the fixation body 2, so that the user can adjust the relative position of the display body 1 and the user's body without an overall movement or rotation.

Still further, an attribute parameter of the fixation body 2 should match a physical parameter of the user, in comparison to the manner of adjusting the relative position now, the technical solution provided in the embodiment of the present application is easier for the user to adjust. For example, when the shape of the fixation body 2 is or approximates an oval, and it is desired to adjust the relative position between the display body 1 and the whist by about 90 degrees. Obviously, it won't be easy to rotate the minor axes to the direction that is from the thumb to the little finger, especially when a damping coefficient of the fixation body 2 is relatively large, it needs to spend more time and effort. However, in the embodiment of the present application, it just needs to directly rotate the display body 1 by 90 degrees.

There are implementation modes for the connection device in particular, which will be described later in detail.

To facilitate the user using the electronic apparatus in the embodiment of the present application in a specific implementation, the electronic apparatus in the embodiment of the present application may further comprise:

(1) Reset Mechanism

In particular, the reset mechanism is disposed at a first setting position of the connection device, the first setting position may be an arbitrary position on the connection device, but in a specific setting, direction of the pull or push generated by the rest mechanism should be set as directed to an initial position, those of ordinary skill in the art can set on their own as needed in practice, the present application makes no specific limitations thereto.

Since the relative position between the display body 1 and the fixation body 2 are changeable, the display body 1 can slide from an initial position on the fixation body 2 to a first position different than the initial position under the action of an external force. When arriving at the first position, the external force stops acting on the display body 1, a recoil force directed to the initial position is generated on the display body by the reset mechanism, so that the display body 1 automatically slides back to the initial position from the first position without any external force.

Since the reset mechanism can generate a recoil force directed to the initial position on the display body that is not at the initial position, so that after the user withdraws the external force, the display body automatically returns to the initial position, which prevents the user from spending time and effort to restore the display back to the initial position, and facilitates the user's using.

(2) Lock Mechanism

In particular, in the embodiment of the present application, the lock mechanism is disposed at a second setting position of the connection device, the second setting position may be an arbitrary position on the connection device, and it may be the same as or different than the first setting position, those of ordinary skill in the art can set on their own as needed in practice, the present application makes no specific limitations thereto.

When the display body 1 slides from an initial position to a second position, the lock mechanism can enhance the friction between the fixation body 2 and the display body 1, or generate a force opposite to a movement trend of the display body 1 at the second position and in the absence of external force, so as to stop the display body 1 from moving to positions other than the second position.

Because of the lock mechanism, after the user applies an external force to the display body and makes it move at the second position, the lock mechanism can lock the display body at the second position, which prevents the display body from moving to other positions, and thereby avoids the user from moving the display body to the second position back and force, and facilitates the user's using.

There are many implementation modes for the fixation body, two among them are listed below, a specific implementation includes but not limited to the following two modes.

First mode: the fixation body has at least a fixed state; the fixation body serves as at least a portion of an annular space or at least a portion of an approximate annular space that satisfies a first predetermined condition; wherein the annular space or the approximate annular space can surround periphery of a columnar body that satisfies a second predetermined condition.

In particular, when the fixation body 2 comprises only one portion, the fixation body itself can form an annular space, as shown in FIG. 2a. If material of the fixation body 2 is lightweight resilient material, then the fixation body 2 specifically has a fixed state and a non-fixated state; if material of the fixation body 2 is hard material, the fixation body 21 has only a fixed state.

When the fixation body comprises two portions, a first end of the first portion is connected to a first side of the display body 1, a third end of the second portion is connected to a second side of the display body 1, the first side and the second side are two sides opposite to each other of the display body 1, as shown in FIG. 2b. Further, if material of the fixation body 2 is hard material, and a second end of the first portion and a fourth end of the second portion are in a non-connected state, the fixation body 2 has only a fixed state, in this case, the first portion and the second portion are two portions of an approximate annular space. The approximate annular space satisfies a first predetermined condition, that is, a diameter between the second end of the first portion and the fourth end of the second portion is smaller than a diameter of a physical part where the wearable electronic apparatus resides, such as a whist, the whist in this case is regarded as a columnar body. The columnar body satisfies a second predetermined condition, that is, larger than a diameter of the annular space, and furthermore, if needs to fix the electronic device relatively at a certain position or height of the columnar body, a diameter between two ends of the columnar body should be smaller than a diameter of the annular space.

It is also possible to set a mated connection mechanism between the second end of the first portion and the fourth end of the second portion, for example, pin buckle, folding clasp, folding safety clasp, or buckle butterfly etc. may be set on the second end and the fourth end, when the second end and the fourth end are connected, the two portions in common form an annular space, the fixation body 2 is in a fixed state, when the second end and the fourth end are in a non-connected state, the fixation body 2 is in a non-fixed state.

Second mode: the fixation body has at least a fixed state; the fixation body serves as at least a portion of an annular space or at least a portion of an approximate annular space that satisfies a first predetermined condition; wherein the annular space or the approximate annular space can surround periphery of an approximate sphere that satisfies a third predetermined condition.

Similarities between the second implementation mode and the first implementation mode are no more repeated herein, the difference between them is, the electronic apparatus is worn at a certain part of the user's body, like head, in this case, the head is regarded as an approximate sphere. The approximate sphere satisfies a third predetermined condition, that is, a diameter of the approximate sphere is lager than a diameter of the annular or approximate annular space.

Two specific implementation modes of the connection devices are illustrated below, and the implementation modes of the reset mechanism and the lock mechanism will be described in detail in different implementation modes of the connection devices. A specific implementation includes but not limited to the following modes.

Figure 4A:
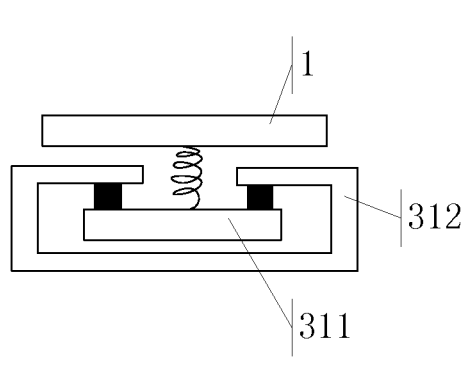
FIGS. 4a-4b are schematic diagrams of structure of the connection device in embodiments of the present application.
Figure 4B:
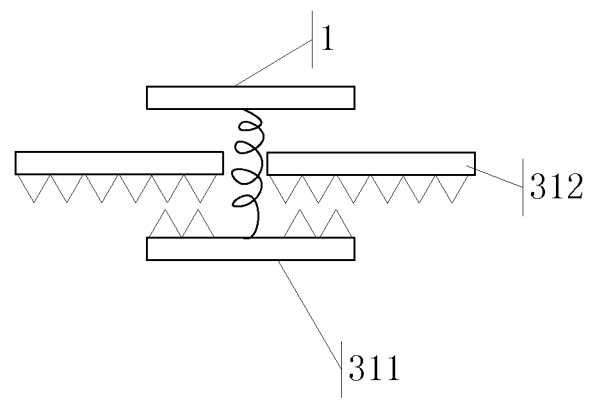

First Mode:

Referring to FIGS. 1, 4a, and 4b, the connection device comprises: a slide chute 312 disposed on the fixation body 2; and a slider 311 connected with the display body 1 and capable of sliding in the slide chute 312.

In a specific implementation, when the user needs to change the relative position between the fixation body 2 and the display body 1, he/she pushes the display body 1, the display body 1 generates a push on the slider 311, the slider 311 is capable of sliding in the slide chute 312, thereby it drives the display body 1 to slide, thus changing the relative position between the fixation body 2 and the display body 1.

In addition, on the other hand, when the connection device comprises the slide chute 312 and the slider 311, the reset mechanism comprises: a resilient architecture 313.

In particular, a first connect end of the resilient architecture 313 is disposed at a first setting position of the slide chute 312, and the other end of the resilient architecture 313, i.e., second connect end, is connected to the slider 311. In a specific implementation, the resilient architecture 313 may be a spring, or a connection member made from elastic material, the present application makes no specific limitations thereto.

Figure 5:
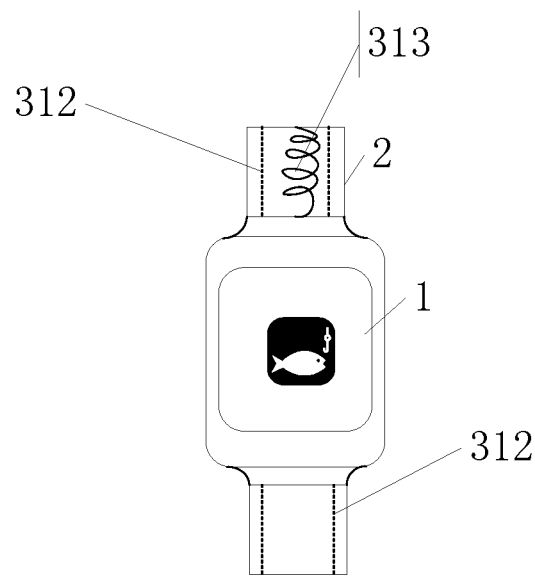
FIG. 5 is a schematic diagram of the reset mechanism in embodiments of the present application.

With the resilient architecture 313 being a spring as example, as shown in FIG. 5, when the user pushes the slider 311 from an initial position to a first position and then withdraws the external force, the spring will generate a pull directed to the first setting position, in this case, the slider 311 automatically returns to the initial position under the action of the pull, and thereby the display body 1 returns to the initial position. After the display body 1 returns to the initial position, the spring restores to an original length, and thus does not act on the slider 311.

On the other hand, when the connection device comprises the slide chute 312 and the slider 311, the lock mechanism comprises: at least one first tooth disposed on a first surface of the slide chute 312; and at least one second tooth disposed on a second surface of the slider 311, the first surface and the second surface facing each other.

In particular, as shown in FIGS. 4a and 4b, in the embodiment of the present application, number of the at least one first tooth and the at least one second tooth may be 1, 10, 39 and so on, and the number of the at least one first tooth and that of the at least one second tooth may be the same or different. In a specific implementation, if each position of the first surface is provided with the first tooth, then the slider 311 can be locked at any position on the slide chute 312.

Further, in order to flexibly push the slider 311 in the slide chute 312, the slider 311 and the display body 1 may be connected via a spring, then if needs to slide, the user presses the display body 1 downward, so that the at least one first tooth and the at least one second tooth are in a non-engaged state, thereafter the user pushes the display body 1 as needed. After the display body 1 arrives at a second position, the user withdraws the external force, so that the at least one first tooth and the at least one second tooth engage with each other. Because of the engagement of the at least one first tooth and the at least one second tooth, moving of the display body 1 is stopped, so that the display body 1 is locked at the second position.

Figure 6:
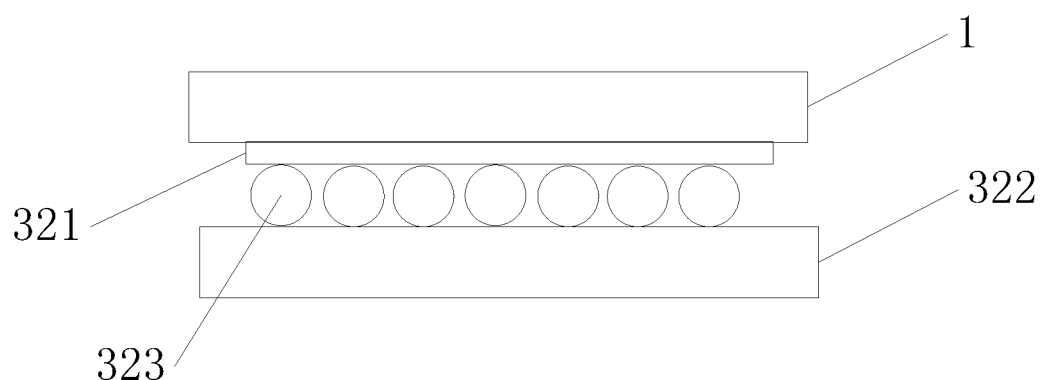
FIG. 6 is a schematic diagram of another structure of the connection device in embodiments of the present application.

Second Mode:

Referring to FIG. 6, the connection device comprises: a slideway 322 disposed on the fixation body 2; a slide vane 321 on which the display body 1 is disposed; and a ball rollably 323 disposed between the slideway 322 and the slide vane 321.

In particular, the display body 1 is disposed on the slide vane 321, when an external force acts on the display body 1, the display body 1 generates a push on the slide vane 321, the slide vane 321 further acts on the ball 323, since the ball 323 is a sphere and has a smooth surface, it rolls, so that the slide vane 321 moves over the ball 323.

In addition, on the other hand, when the connection device comprises the slideway 322, the slide vane 321, and the ball 323, the reset mechanism comprises: a resilient architecture 313.

In particular, a first connect end of the resilient architecture 313 is disposed at a second setting position of the slideway 322, and the other end of the resilient architecture 313, i.e., second connect end, is connected to the slide vane 321. In a specific implementation, the resilient architecture 313 may be a spring, or a connection member made from elastic material, the present application makes no specific limitations thereto.

With the resilient architecture 313 being a spring as example, as shown in FIG. 5, when the user pushes the slide vane 321 from an initial position to a second position and then withdraws the external force, the spring will generate a pull directed to the second setting position, in this case, the slide vane 321 automatically returns to the initial position under the action of the pull, and thereby the display body 1 returns to the initial position. After the display body 1 returns to the initial position, the spring restores to an original length, and thus does not act on the slide vane 321.

On the other hand, when the connection device comprises the slideway 322, the slide vane 321, and the ball 323, the lock mechanism comprises: at least one groove 324.

Figure 7:
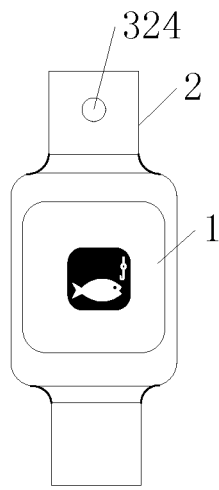
FIG. 7 is a schematic diagram of the lock mechanism in embodiments of the present application.

In particular, as shown in FIG. 7, in the embodiment of the present application, the at least one groove 324 is disposed at the second position, and it can mate with the ball 323, for example, a radius of the ball 323 is 0.035 cm, then the at least one groove also is cut from a spherical tool and has a radius of 0.035 cm. After the ball 323 rolls into the at least one groove 324, the at least one groove 324 can stop the ball 323 from further rolling, thereby the slide vane 321 is fixed at the second position, thus locking the display body 1 at the second position.

Third Mode:

Referring to FIG. 3, the connection device comprises: a rotation shaft 331 with two ends both being connected onto the fixation body 2; a third side of the display body 1 is connected with the rotation shaft 331.

In particular, two ends of the rotation shaft are connected onto the fixation body 2, thus fixing the rotation shaft on the fixation body 2. A third side of the display body 1 is connected onto the rotation shaft 331, thus a torque is formed in a direction from the fourth side of the display body to the second side thereof. When an external force acts on display body 1, the display body 1 rotates around the rotation shaft 331, thus changing the relative position between the display body 1 and the fixation body 2.

In the embodiment of the present application, the third side and the fourth side are opposite to each other, the third side are connected with the first side and the second side.

Further, a spring may be connected between the fixation body 2 and the display body 1, when the display body 1 and the fixation body 2 are fitted, the spring is of the original length and does no act on the display body 1. When the relative position between the display body 1 and the fixation body 2 are changed, the spring is stretched, and thereby it generates a pull on the display body 1, so that the display body 1 can return to the initial position, that is, the position fitting the fixation body 2.

Further, in the embodiment of the present application, the electronic apparatus further comprises: a detection device and a processor.

In particular, the detection device is configured to detect a current relative position between the display body 1 and the fixation body 2. In a specific implementation, the detection device may be a gravity sensor disposed internally within the display body 1, when the display body 1 moves or rotates on the fixation body 2, the gravity sensor can obtain the current relative position by detecting vector information of a current gravity acceleration of the display body 1.

In addition, the detection device may also be an infrared sensor disposed on the fixation body 2. A plurality of transmitter sub-ends of the infrared sensor are disposed at a plurality of positions of the fixation body 2, and a plurality of corresponding receiver sub-ends are disposed at positions corresponding to each direction of transmitting, wherein the display body 1 can travel through each transmitter sub-end and each receiver sub-end. When the display body 1 slides between a pair of transmitter sub-end and receiver sub-end, the receiver sub-end cannot receive infrared from the transmitter sub-end. Thus, the current relative position can be obtained based on the position of the receiver sub-end that cannot receive infrared normally.

Of course, the detection device may also be a capacitive sensor. A plurality of capacitors are disposed on the fixation body 2, and the display body 1 can travel through two plates of each capacitor. Further, at least one plate is disposed at each of the third side and fourth side of the display body, when the display body 1 is between two plates, since plates are disposed at both sides of the display body 1, thus impedance of the position where the display body 1 resides changes, but impedance of other positions does not change. Therefore, the current relative position can be obtained by detecting the capacitor whose impedance changes.

Naturally, in a specific implementation, types and setting modes of the detection device include but not limited to the above three ones, those of ordinary skill in the art can set on their own as needed in practice, the present application makes no specific limitations thereto.

When the detection device detects that the current relative position of the display body is different than an initial relative position, the processor connected with the detection device generates a switch instruction to switch the display body from a non-display state to a display state, wherein the initial position is a default position.

From the above description, it is seen that when the relative position between the display body and the fixation body changes to a position different than the initial position, the processor can automatically switch the display body from the non-display state to the display state, so that when the user needs to the switch the display body to the display state, he/she only needs to change the relative position.

In addition, the electronic apparatus further comprises: an input device disposed on the display body 1 or the fixation body 2 and connected with the processor.

In particular, in the embodiment of the present application, the input device may be a button disposed on the display body 1 or the fixation body 2, and may also be a touch display screen disposed on surface of the display body 1, and may also be a fingerprint identification component disposed on the display body 1 or the fixation body 2, the present application makes no limitations thereto.

When the processor receives trigger information sent by the input device, the processor still generates the switch instruction to switch the display body from the non-display state to the display state, in other words, the user can achieve the effect of the switching the display body 1 to the display state either by changing the relative position between the display body 1 and the fixation body 2 or triggering the input device.

Figure 8A:
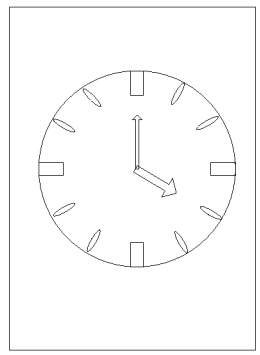
FIG. 8a is a schematic diagram of the first image information in embodiments of the present application.
Figure 8B:
FIG. 8b is a schematic diagram of the second image information in embodiments of the present application.

After switching the display body 1 to the display state by triggering the input device, the processors further controls the display body 1 to output second image information, which is supposed as shown in FIG. 8b.

In particular, the second image information is different than the first image information. The first image information is image information output by the display body as controlled by the processor after the processor generates the switch instruction based on the detection device detects that the current relative position of the display body is different than the initial relative position. In other words, when the current relative position is different than the initial position, the processor first generates the switch instruction to switch the display body 1 to the display state, and further controls the display body 1 to output the first image information, which is supposed as shown in FIG. 8a.

Therefore, the user can select to switch the state of the display body and display the first image information by changing the relative position, or to display the second image information via the input device.

In addition, after the processor switches the display body 1 to the display state, it is also possible to not input the first image information, but to: determine an i-th preset position of the current relative position from among N preset positions, N being a positive integer, i being an integer from 1 to N; determine an i-th application corresponding to the i-th preset position from among N applications, the N applications being different to each other; and generate an instruction for starting the i-th application to start the i-th application and control the display body to display the i-th application.

In particular, N different applications are installed in the electronic apparatus, wherein N is a positive integer, like 1, 2, 5, and so on. When the relative position between the display body 1 and the fixation body 2 is different than the initial position, first, an i-th preset position of the current relative position is determined from among N preset positions, and then the processor starts an i-th application corresponding to the i-th preset position and controls the display body 1 to display the i-th application.

Here is an example, it is supposed that the electronic apparatus in the embodiment of the present application is fixed on the whist of the user' right hand via the fixation body 2. Three applications, application A, application B, application C, are installed in the electronic apparatus, wherein the first preset position to which application A corresponds is that the display body 1 is at a lower part of the palm center of the right hand, the second preset position to which application B corresponds is that the display body 2 is at a lower part of the back of the right hand, and the third preset position to which application C corresponds is that the display body 2 is at a lower part of the thumb of the right hand. And the initial position is that the display body 2 is at a lower part of the little finger of the right hand.

When the user needs to start and view application A, the fixation body 2 is fixed, the user pushes the display body 1 to a lower part of the palm center of the right hand from the initial position. The detection device detects that the current relative position is that the display body is at a lower part of the palm center of the right hand, and sends the detected information to the processor. Based on the detected information, the processors immediately generates a switch instruction to switch the display body 1 from the non-display state to the display state, and based on the detected information, determines that the current relative position is the first preset position, the corresponding application is application A, and the processor thereby generates a start instruction to start application A and controls application A to be displayed on the display body 1.

From the above description, it is seen that when the user needs to start and view a different application, he/she only needs to change the relative position between the display body 1 and the fixation body 2 to the corresponding preset position, the user does not need to search the application that needs to be started from among a plurality of applications after the user manually switches the display body 1 to the display state and then start it, which improves user experience.

Second Embodiment

The embodiment of the present application provides an information processing method applied to an electronic apparatus, as shown in FIGS. 1-8b, the electronic apparatus having a display body 1 configured to output image information in a display state, a fixation body 2 configured to maintain a relative position relationship between the electronic apparatus and at least a portion of a user's body when the electronic apparatus is in a fixed state, and a connection device configured to connect the display body 1 and the fixation body 2 and through which a relative position between the display body 1 and the fixation body 2 can be changed.

As for specific structures and implementation modes of the electronic apparatus in the second embodiment, please make a reference to the first embodiment and FIGS. 1-8b, no more details repeated herein.

Figure 9:
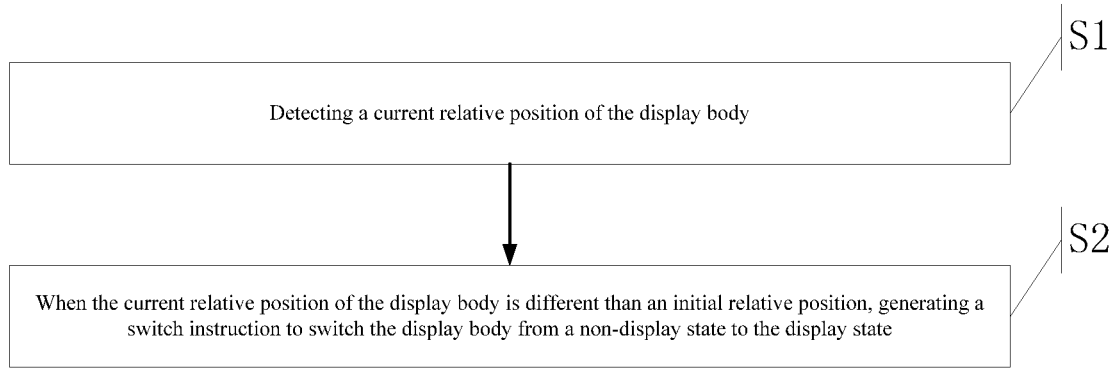
FIG. 9 is a flowchart of the information processing method in embodiments of the present application.

Referring to FIG. 9, the method in the embodiment of the present application comprises:

S1: detecting a current relative position of the display body; and

S2: when the current relative position of the display body is different than an initial relative position, generating a switch instruction to switch the display body from a non-display state to the display state.

In particular, there are many ways to detect the current relative position, for example, through a gravity sensor, an infrared sensor, or a capacitive sensor etc., the present application makes no specific limitations thereto. As for the specific detection ways, please make a reference to the discussions about the detection device in the first embodiment, no more details repeated herein.

When it is detected that the current relative position between the display body 1 and the fixation body 2 is different than an initial relative position, the electronic apparatus generates a switch instruction to switch the display body 1 from a non-display state to the display state, wherein the initial position is a default position.

From the above description, it is seen that when the relative position between the display body and the fixation body changes to a position different than the initial position, the processor can automatically switch the display body from the non-display state to the display state, so that when the user needs to the switch the display body to the display state, he/she only needs to change the relative position.

The aforesaid one or more technical solutions in embodiments of the present application at least have the following one or more technical effects:

In the technical solutions of the present application, the electronic apparatus comprises a display body configured to output image information in a display state, a fixation body configured to maintain a relative position relationship between the electronic apparatus and at least a portion of a user's body when the electronic apparatus is in a fixed state, and the display body and the fixation body are connected through a connection device, through the connection device, the technical problem that the relative position between respective bodies of wearable devices are unchangeable is solved, and the technical effect that a relative position between the display body and the fixation body of the electronic apparatus are changeable is achieved.

Those skilled in the art should understand that, the embodiments of the present disclosure can be provided as a method, a system or a computer program product. Therefore, the present disclosure can adopt forms of a full hardware embodiment, a full software embodiment, or an embodiment combining software and hardware aspects. And, the present disclosure can adopt forms of a computer program product implemented on one or more computer usable storage mediums (including, but not limited to, magnetic disk storage, CD-ROM, optical memory, or the like) including computer usable program codes.

The present disclosure is described by referring to flow charts and/or block diagrams of method, apparatus (system) and computer program product according to the embodiments of the present disclosure. It should be understood that each flow and/or block in the flow charts and/or block diagrams and the combination of the flow and/or block in the flow charts and/or block diagrams can be implemented by computer program instructions. These computer program instructions can be provided to processors of a general purpose computer, a dedicated computer, an embedded processor or other programmable data processing apparatus to generate a machine, so that a device for implementing functions specified in one or more flows of the flow charts and/or one or more blocks of the block diagrams is generated by the instructions executed by the processors of the computer or other programmable data processing apparatus.

These computer program instructions can also be stored in computer readable storage which is able to direct the computer or other programmable data processing apparatus to operate in specific manners, so that the instructions stored in the computer readable storage generate manufactured articles including commander equipment, which implements functions specified by one or more flows in the flow charts and/or one or more blocks in the block diagrams.

These computer program instructions can be loaded to computer or other programmable data processing apparatus, so that a series of operation steps are executed on the computer or other programmable apparatus to generate computer implemented process, so that the instructions executed on the computer or other programmable apparatus provide steps for implementing functions specified in one or more flows of the flow charts and/or one or more blocks of the block diagrams.

In particular, the computer program instructions to which the information processing method in the embodiments of the present application correspond can be stored in an optical disk, a hard disk, a U disk, and other storage medium, when the computer program instructions corresponding to the information processing method as stored in the storage medium are read or executed by an electronic apparatus, the following steps are comprised: detecting a current relative position of the display body; and when the current relative position of the display body is different than an initial relative position, generating a switch instruction to switch the display body from a non-display state to the display state.

Obviously, those skilled in the art can make various modifications and variations to the present disclosure without departing from the spirit and scope thereof. Thus, if these modifications and variations of the present disclosure are within the scope of the claims of the invention as well as their equivalents, the present disclosure is also intended to include these modifications and variations.

The invention claimed is:

1. An electronic apparatus, comprising:
   a display body configured to output image information in a display state;
   a fixation body configured to attach the electronic apparatus to a portion of a user's body and comprises a fixed state; and
   a connection device comprising:
      a first sub-connection device that connects to the display body; and
      a second sub-connection device that connects to the fixation body and disposes along the fixation body so as to form a track on the fixation body, wherein when the fixation body is in the fixed state, the first sub-connection device slides along-the track formed by the second sub-connection device in response to an external force so as to change a relative position between the display body and the fixation body; and
   a reset mechanism comprising a resilient architecture, the resilient architecture comprising:
      a first connect end connected to the first sub-connection device; and
      a second connect end connected to the second sub-connection device, wherein the resilient architecture generates a recoil force to move the first subconnection device so as to return the display body back to an initial position on the fixation body automatically in response to the absence of the external force.

2. The electronic apparatus of claim 1 further comprising a lock mechanism disposed at a second position of the connection device and configured to lock the display body relative to the fixation body.

3. The electronic apparatus of claim 1, wherein the fixation body provides at least a portion of an annular space, with the at least one portion of the annular space surrounding a periphery of a columnar body of the fixation body.

4. The electronic apparatus of claim 1 further comprising:
a detection device configured to detect a relative position between the display body and the fixation body; and
a processor disposed internally within the display body and connected with the detection device wherein the processor is operable to generate a switch instruction so that the display body operates in the display state upon the detection device detecting a change in the relative position between the display body and the fixation body.

5. The electronic apparatus of claim 4 further comprising an input device disposed on the display body or the fixation body and connected with the processor, wherein the processor is operable to generate a control instruction to control the display body to output a different image information upon receiving trigger information from the input device.

6. The electronic apparatus of claim 4, wherein the processor is configured to:
determine an i-th preset position of the relative position from among N preset positions, N being a positive integer, i being an integer from 1 to N;
determine an i-th application corresponding to the i-th preset position from among N applications, the N applications being different to each other; and
generate an instruction for starting the i-th application to start the i-th application and control the display body to display the i-th application.

7. The electronic apparatus of claim 1, wherein the connection device comprises a slide chute disposed on the fixation body and a slider connected with the display body and capable of sliding in the slide chute.

8. The electronic apparatus of claim 7, wherein the first connect end of the resilient architecture is disposed at a first position of the slide chute and the second connect end of the resilient architecture is connected to the slider.

9. The electronic apparatus of claim 7 further comprising a lock mechanism for locking the display body relative to the fixation body, wherein the lock mechanism comprises:
at least one first tooth disposed on a first surface of the slide chute; and
at least one second tooth disposed on a second surface of the slider, the first surface and the second surface facing each other;
the at least one first tooth and the at least one second tooth engage with each other so that the display body is locked at the second position.

10. The electronic apparatus of claim 1, wherein the connection device comprises:
a slideway disposed on the fixation body;
a slide vane on which the display body is disposed; and
a ball rollably disposed between the slideway and the slide vane.

11. The electronic apparatus of claim 10, wherein the first connect end of the resilient architecture is disposed at a second setting position of the slideway and the second connect end of the resilient architecture is connected to the slide vane, wherein, when the display body is located at the initial position, the resilient architecture does not act on the slide vane.

12. The electronic apparatus of claim 10 further comprising a lock mechanism for locking the display body relative to the fixation body, wherein the lock mechanism comprises at least one groove disposed at the second position and mating to the ball so as to lock the display body at the second position.

13. The electronic apparatus of claim 1, wherein the fixation body comprises two free ends that do not overlap one another when the fixation body is in the fixed state.

14. The electronic apparatus of claim 1, wherein the fixation body does not comprise portions that overlap one another.

15. An information processing method applied to an electronic apparatus that comprises:
a display body configured to output image information in a display state;
a fixation body configured to attach the electronic apparatus to a user's body and comprises a fixed state; and
a connection device comprising:
a first sub-connection device that connects to the display body; and
a second sub-connection device that connects to the fixation body and disposes along the fixation body so as to form a track on the fixation body, wherein when the fixation body is in the fixed state, the first sub-connection device slides along the track formed by the second sub-connection device in response to an external force so as to change a relative position between the display body and the fixation body; and
a reset mechanism comprising a resilient architecture, the resilient architecture comprising:
a first connect end connected to the first sub-connection device; and
a second connect end connected to the second sub-connection device, wherein the resilient architecture generates a recoil force to move the first subconnection device so as to return the display body back to an initial position on the fixation body automatically in response to the absence of the external force, the information processing method comprising:
detecting a relative position between a display body and a fixation body of the electronic device; and
generating a switch instruction so that the display body operates in a display state.

16. The information processing method of claim 15, wherein the fixation body comprises two free ends that do not overlap one another when the fixation body is in the fixed state.

17. The information processing method of claim 15, wherein the fixation body does not comprise portions that overlap one another.

* * * * *